J. SCHAFHAUS.
MASH-MACHINE FOR BREWERS.
No. 185,702. Patented Dec. 26, 1876.
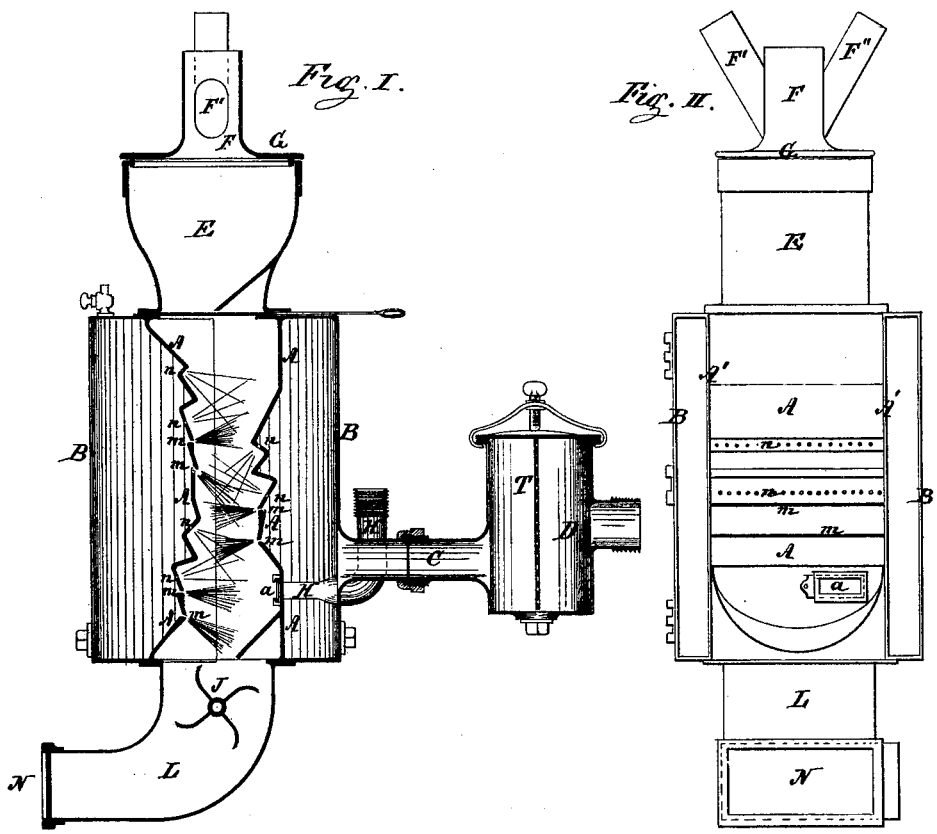
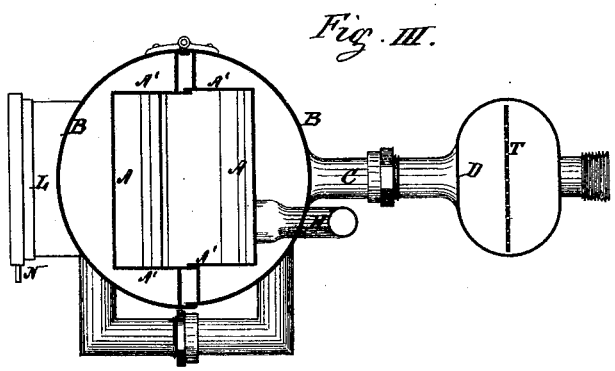

UNITED STATES PATENT OFFICE.

JOHN SCHAFHAUS, OF NEW YORK, N. Y.

IMPROVEMENT IN MASH-MACHINES FOR BREWERS.

Specification forming part of Letters Patent No. 185,702, dated December 26, 1876; application filed March 17, 1876.

*To all whom it may concern:*

Be it known that I, JOHN SCHAFHAUS, of New York, in the State of New York, have invented a new and useful Improvement in Mash-Machines for Brewers, of which the following is a specification:

This invention is an improvement in the machines patented by me on the 6th day of April, 1875; and consists in the arrangement of the holes and openings through which the water enters the interior chamber in such a manner that the same can readily be cleaned in case they become stopped up, and at the same time to dispense with any projecting tubes or other parts, whereby, at their connections with the side walls of the chamber, corners or cavities might be formed for the lodgment or accumulation of particles, whereby acidity might be generated; and, further, in the arrangement and combination, with the lower part of mash-machine, of a suitable pipe to conduct any other product into the same and mix with the mash before the same passes into the mash-tub.

In the accompanying drawing, Figure I represents a section of a mash-machine embodying my invention. Fig. II is an inside front view of the same, with one-half of the machine removed. Fig. III is a horizontal section of the same.

A A' represent the walls of the inner chamber, and B of the outer chamber, between which the water used in the mashing process is introduced through the pipe C, after having passed through the chamber D, containing a very fine sieve, T, whereby this water is strained and cleaned of all impurities. The walls A A of the inner chamber have inclined projecting surfaces, arranged alternately to each other, so that the material to be mashed and introduced through the hopper E will fall from one upon the other, to insure every particle to come several times in contact with different streams of water. Some of these inclined surfaces are perforated with fine holes $n$, and are likewise provided with slits $m$, which extend the whole width of the wall, whereby flat, continuous streams of water are directed into the interior, while through the holes $n$ a fine spray is produced. By this arrangement the material introduced through the hopper E is made to pass through the several fine sprays and flat streams of water before reaching the bottom of the machine, thereby insuring the perfect mashing process.

The flat streams of water are made to run upon the opposite surfaces, to prevent any lodgment of particles upon the same, whereby acidity might be generated during the process of mashing.

The advantage of this arrangement of fine holes $n$, and of the longitudinal openings or slits $m$, therein, consists, first, that after the process of mashing these inner surfaces A A, although made inclined inward and outward, form all smooth surfaces, which are readily cleaned, and offer no opportunities for the secretion of any particles whereby acidity can be generated; and, secondly, these openings and slits can easily be cleaned, after each operation, of any sediment which may have stopped up the same.

The cover G of the hopper E is arranged with two or more branches or openings, F F' F'', connected with as many different reservoirs or bins, to allow several sorts of wheat or other material to be introduced at the same time, mixed in the hopper E, and then introduced together through the mash-machine.

Near the bottom of the machine a pipe, H, is arranged, closed by a suitable valve, $a$, to introduce any fluid mixture with the mash, and which passes then, together with the mash, upon the revolving wheel J, and becomes thereby well mixed with the same before passing into the reservoir, where the mash is collected. At the end of the passage or channel L a valve, N, is arranged, for the purpose of closing the same after the mashing process is completed, to prevent the admission of steam or vapors into the machine, and through the same into the reservoirs or bins containing the wheat, and which are connected, through the pipes F F' F'', with the machine, as above described.

What I claim as my invention, and desire to secure by Letters Patent, is—

In a mash-machine, consisting of an inner and outer chamber, the bent surfaces A A, forming the opposite walls of the inner chamber, and provided with fine holes $n$ and longitudinal openings or slits $m$, arranged and constructed substantially in the manner and for the purpose described.

JOHN SCHAFHAUS.

Witnesses:
   HENRY E. ROEDER,
   FRED. SCHAFHAUS.